United States Patent
Rajput et al.

(10) Patent No.: US 11,695,563 B2
(45) Date of Patent: Jul. 4, 2023

(54) METHODS, SYSTEMS, AND COMPUTER READABLE MEDIA FOR SINGLE-USE AUTHENTICATION MESSAGES

(71) Applicant: Oracle International Corporation, Redwood Shores, CA (US)

(72) Inventors: Jay Rajput, Bangalore (IN); Virendra Singh, Bangalore (IN); John Nirmal Mohan Raj, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/314,382

(22) Filed: May 7, 2021

(65) Prior Publication Data

US 2022/0360447 A1    Nov. 10, 2022

(51) Int. Cl.
*H04L 9/32* (2006.01)
*H04L 9/40* (2022.01)
*H04W 12/06* (2021.01)

(52) U.S. Cl.
CPC .......... *H04L 9/3228* (2013.01); *H04L 9/3236* (2013.01); *H04L 63/0281* (2013.01); *H04W 12/06* (2013.01)

(58) Field of Classification Search
CPC . H04L 9/3228; H04L 9/3236; H04L 63/0281; H04W 12/06
See application file for complete search history.

(56) References Cited

U.S. PATENT DOCUMENTS

| 1,872,857 | A  | 8/1931  | Wesson et al. |
| 5,835,087 | A  | 11/1998 | Herz et al. |
| 6,185,612 | B1 | 2/2001  | Jensen et al. |
| 6,298,383 | B1 | 10/2001 | Gutman et al. |
| 7,266,837 | B2 | 9/2007  | Monjas-Llorente et al. |
| 8,127,016 | B2 | 2/2012  | Westman et al. |

(Continued)

FOREIGN PATENT DOCUMENTS

| CN | 1964316     | 5/2007 |
| CN | 103039049 B | 8/2016 |

(Continued)

OTHER PUBLICATIONS

Commonly-Assigned, co-pending U.S. Appl. No. 17/314,329 for "Methods, Systems, and Computer Readable Media for Protecting Against Mass Network Function (NF) Deregistration Attacks," (Unpublished, filed May 7, 2021).

(Continued)

*Primary Examiner* — Kristine L Kincaid
*Assistant Examiner* — Lydia L Noel
(74) *Attorney, Agent, or Firm* — Jenkins, Wilson, Taylor & Hunt, P.A.

(57) ABSTRACT

A method for creating single-use authentication messages includes creating, at a consumer network function of a core network of a telecommunications network, a message hash of at least a subset of a request message. The method includes adding, at the consumer network function, the message hash to a client credentials assertion (CCA) token for the consumer network function. The method includes sending, from the consumer network function, the request message with the CCA token to a producer network function.

14 Claims, 8 Drawing Sheets

(56) References Cited

U.S. PATENT DOCUMENTS

| | | | |
|---|---|---|---|
| 8,171,032 B2 | 5/2012 | Herz | |
| 8,218,459 B1 | 7/2012 | Stucker | |
| 8,218,490 B2 | 7/2012 | Rydnell et al. | |
| 8,626,157 B2 | 1/2014 | Nas et al. | |
| 8,929,360 B2 | 1/2015 | Agarwal et al. | |
| 9,094,819 B2 | 7/2015 | McCann et al. | |
| 9,253,163 B2 | 2/2016 | Donovan | |
| 9,967,148 B2 | 5/2018 | Goyal et al. | |
| 10,033,736 B2 | 7/2018 | McCann | |
| 10,547,613 B1* | 1/2020 | Roths | H04L 9/0844 |
| 10,609,154 B2 | 3/2020 | Talebi Fard et al. | |
| 10,833,938 B1 | 11/2020 | Rajput et al. | |
| 10,834,571 B1 | 11/2020 | Yau et al. | |
| 11,638,155 B2 | 4/2023 | Rajput et al. | |
| 2003/0227894 A1 | 12/2003 | Wang et al. | |
| 2005/0235000 A1 | 10/2005 | Keil | |
| 2006/0078119 A1 | 4/2006 | Jee et al. | |
| 2006/0155871 A1 | 7/2006 | Ilkka et al. | |
| 2006/0259759 A1 | 11/2006 | Maino et al. | |
| 2007/0019616 A1* | 1/2007 | Rantapuska | H04L 63/065 370/352 |
| 2007/0250642 A1 | 10/2007 | Thubert et al. | |
| 2007/0297419 A1 | 12/2007 | Askerup et al. | |
| 2008/0010669 A1 | 1/2008 | Aittola et al. | |
| 2008/0039104 A1 | 2/2008 | Gu et al. | |
| 2009/0080440 A1 | 3/2009 | Balyan et al. | |
| 2009/0165017 A1 | 6/2009 | Syed et al. | |
| 2009/0232011 A1 | 9/2009 | Li et al. | |
| 2009/0265467 A1 | 10/2009 | Peles | |
| 2009/0305684 A1 | 12/2009 | Jones et al. | |
| 2009/0313379 A1 | 12/2009 | Rydnell et al. | |
| 2010/0291923 A1 | 11/2010 | Zhou et al. | |
| 2011/0165901 A1 | 7/2011 | Baniel et al. | |
| 2011/0195710 A1 | 8/2011 | Nas et al. | |
| 2011/0302244 A1 | 12/2011 | McCann et al. | |
| 2012/0155389 A1 | 6/2012 | McNamee et al. | |
| 2012/0157047 A1 | 6/2012 | Chen et al. | |
| 2012/0158994 A1 | 6/2012 | McNamee et al. | |
| 2012/0226814 A1 | 9/2012 | Stucker | |
| 2013/0097418 A1 | 4/2013 | Bhatt et al. | |
| 2013/0151845 A1 | 6/2013 | Donovan | |
| 2013/0185767 A1 | 7/2013 | Tirupachur Comerica et al. | |
| 2013/0290722 A1 | 10/2013 | Kall et al. | |
| 2016/0352696 A1 | 12/2016 | Essigmann et al. | |
| 2017/0012824 A1 | 1/2017 | Goyal et al. | |
| 2017/0214691 A1 | 7/2017 | McCann | |
| 2019/0260803 A1 | 8/2019 | Bykampadi et al. | |
| 2020/0036754 A1 | 1/2020 | Nos | |
| 2020/0186359 A1 | 6/2020 | Chan et al. | |
| 2020/0245139 A1 | 7/2020 | Nakarmi et al. | |
| 2021/0083965 A1 | 3/2021 | Taft et al. | |
| 2021/0250172 A1* | 8/2021 | Choyi | H04W 12/06 |
| 2021/0288802 A1 | 9/2021 | Muhanna et al. | |
| 2021/0385286 A1 | 12/2021 | Wang et al. | |
| 2022/0052992 A1 | 2/2022 | Zhang et al. | |
| 2022/0124468 A1 | 4/2022 | Lu et al. | |
| 2022/0225084 A1 | 7/2022 | Rajput et al. | |
| 2022/0345486 A1 | 10/2022 | Rajput et al. | |
| 2022/0346188 A1 | 10/2022 | Malhotra | |
| 2022/0360989 A1 | 11/2022 | Rajput et al. | |
| 2022/0360991 A1 | 11/2022 | Rajput et al. | |
| 2022/0361085 A1 | 11/2022 | Rajput et al. | |
| 2022/0369204 A1 | 11/2022 | Jeong et al. | |

FOREIGN PATENT DOCUMENTS

| | | | |
|---|---|---|---|
| CN | 111163473 A | 5/2020 | |
| EP | 1 848 150 A1 | 10/2007 | |
| EP | 1 873 980 A1 | 1/2008 | |
| EP | 3 588 862 A1 | 1/2020 | |
| KR | 10-1506232 | 3/2015 | |
| WO | WO 2007/125498 A1 | 11/2007 | |
| WO | WO 2011/156274 A2 | 12/2011 | |
| WO | WO 2020/053481 A1 | 3/2020 | |
| WO | WO-2022043130 A1 * | 3/2022 | |
| WO | WO 2022/235373 A1 | 11/2022 | |
| WO | WO 2022/235462 A1 | 11/2022 | |
| WO | WO 2022/235463 A1 | 11/2022 | |

OTHER PUBLICATIONS

Commonly-Assigned, co-pending U.S. Appl. No. 17/314,300 for "Methods, Systems, and Computer Readable Media for Hiding Network Function Instance Identifiers," (Unpublished, filed May 7, 2021).

Commonly-Assigned, co-pending U.S. Appl. No. 17/308,972 for "Methods, Systems, and Computer Readable Media for Generating and Using Single-Use Oauth 2.0 Access Tokens for Securing Specific Service-Based Architecture (SBA) Interfaces," (Unpublished, filed May 5, 2021).

Commonly-Assigned, co-pending U.S. Appl. No. 17/236,775 for "Methods, Systems, and Computer Readable Media for Mitigating Network Function (NF) Update and Deregister Attacks," (Unpublished, filed Apr. 21, 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

Corrected Notice of Allowability for U.S. Appl. No. 15/003,647 (dated Jun. 28, 2018).

Communication pursuant to Article 94(3) EPC for European Patent Application Serial No. 11 792 956.2 (dated Apr. 23, 2018).

Notice of Allowance and Fee(s) Due for U.S. Appl. No. 15/003,647 (dated Mar. 7, 2018).

Notice of Allowance and Fee(s) Due for U.S. Appl. No. 14/795,601 (dated Dec. 28, 2017).

Applicant Initiated Interview Summary for U.S. Appl. No. 14/795,601 (dated Nov. 24, 2017).

Non-Final Office Action for U.S. Appl. No. 15/003,647 (dated Oct. 10, 2017).

Non-Final Office Action for U.S. Appl. No. 14/795,601 (dated Aug. 18, 2017).

Notification to grant a Chinese patent for Chinese Patent Application No. ZL201180032307.4 (dated Jun. 23, 2016).

Extended European Search Report for European Application No. 11792956.2 (dated Feb. 8, 2016).

Notification of the Third Office Action for Chinese Application No. 201180032307.4 (dated Jan. 25, 2016).

"RADIUS," https://en.wikipedia.org/wiki/RADIUS#Accounting, pp. 1-17 (Nov. 27, 2015).

Notice of Allowance for U.S. Appl. No. 13/712,481 dated Oct. 20, 2015.

Notice of Allowance for U.S. Appl. No. 13/712,481 dated Sep. 25, 2015.

Notification of the Second Office Action for Chinese Application No. 201180032307.4 (dated Jul. 17, 2015).

Commonly-Assigned, co-pending U.S. Appl. No. 14/795,601 for "Methods, Systems, and Computer Readable Media for Selective Diameter Topology Hiding," (Unpublished, filed Jul. 9, 2015).

Non-Final Office Action for U.S. Appl. No. 13/832,137 (dated Jun. 2, 2015).

Non-Final Office Action for U.S. Appl. No. 13/712,481 (dated Apr. 29, 2015).

Notice of Allowance for U.S. Appl. No. 13/154,119 dated Apr. 16, 2015.

Notice of Allowance and Applicant Initiated Interview Summary for U.S. Appl. No. 13/154,119 dated Mar. 17, 2015.

Advisory Action Before the Filing of an Appeal Brief for U.S. Appl. No. 13/712,481 (dated Mar. 11, 2015).

Email Regarding Decision to Grant for Korean Patent Application No. 2012-7034449 (dated Mar. 2, 2015).

(56) References Cited

OTHER PUBLICATIONS

Final Office Action for U.S. Appl. No. 13/712,481 (dated Dec. 3, 2014).
Notification of the First Office Action for Chinese Patent Application No. 201180032307.4 (dated Nov. 4, 2014).
Office Action for Korean Patent Application No. 2012-7034449 (dated Oct. 14, 2014).
Non-Final Office Action for U.S. Appl. No. 13/712,481 (dated May 8, 2014).
Notice of Preliminary Rejection for Korean Patent Application No. 2012-7034449 (dated Apr. 25, 2014).
Advisory Action for U.S. Appl. No. 13/154,119 dated Jan. 22, 2014.
Zhang et al., "TOHIP: A topology-hiding multipath routing protocol in mobile ad hoc networks," Ad Hoc Networks 21, pp. 109-122 (2014).
Final Office Action for U.S. Appl. No. 13/154,119 dated Oct. 25, 2013.
Notice of Allowance and Fee(s) Due for U.S. Appl. No. 13/021,402 (dated Sep. 9, 2013).
Non-Final Office Action for U.S. Appl. No. 13/154,119 dated May 2, 2013.
Communication of European publication number and information on the application of Article 67(3) EPC for European Patent Application No. 11792956.2 (Mar. 13, 2013).
"EliteDSC—LTE Roaming," http://www.elitecore.com/telecompractices/lteroaming.html, pp. 1-2 (Copyright 2013).
Non-Final Office Action for U.S. Appl. No. 13/021,402 (dated Nov. 8, 2012).
Hardt, "The OAuth 2.0 Authorization Framework", Internet Engineering Task Force (IETF) Request for Comments (RFC) 6749, pp. 1-76 (2012).
Notification of Transmittal of the International Search Report and the Written Opinion of the International Searching Authority, or the Declaration for International Application No. PCT/US2011/039285 (dated Feb. 9, 2012).
Notification of Transmittal of the International Search Report and the Written Opinion of the International Searching Authority, or the Declaration for International Application No. PCT/US2011/023752 (dated Oct. 26, 2011).
"Topology Hiding," Chapter 13, Cisco Unified Border Element (SP Edition) Configuration Guide: Distributed Model, pp. 13-1-13-10 (Mar. 29, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Core Network and Terminals; InterWorking Function (IWF) Between MAP Based and Diameter Based Interfaces (Release 9)," 3GPP TS 29.305 V9.0.0, pp. 1-63 (Dec. 2009).
Chiba et al., "Dynamic Authorization Extensions to Remote Authentication Dial in User Service (RADIUS)," RFC 5176, pp. 1-31 (Jan. 2008).
"Features—Kamailio (OpenSER) SIP Server," http://www.kamailio.org/w/features/, pp. 1-3 (Copyright 2008-2015).
Rouse, M., "Platform," searchservervirtualization.techtarget.com/definition/platform, pp. 1-2 (Sep. 2006).
Leach et al., "A Universally Unique IDentifier (UUID) URN Namespace," Network Working Group, RFC 4122, pp. 1-32 (Jul. 2005).
Calhoun et al., "Diameter Base Protocol," RFC 3588, pp. 1-147 (Sep. 2003).
Calhoun et al., "Diameter Base Protocol," draft-ietf-aaa-diameter-07, Section 6.3, p. 68 (Jul. 2001).
Calhoun et al., "Diameter Base Protocol," The Internet Society, pp. 1-64 (Mar. 2001).
Rigney et al., "RADIUS Accounting," RFC 2866, pp. 1-28 (Jun. 2000).
Rigney et al., "Remote Authentication Dial in User Service (RADIUS)," RFC 2865, pp. 1-68 (Jun. 2000).
Farago et al., "Virtual path network topology optimization using random graphs," INFOCOM '99, 18th Annual Joint Conference of the IEEE Computer and Communications Societies, vol. 2, pp. 491-496 (Mar. 1999).
Goldschlag et al., "Hiding Routing Information," Springer Berlin Heidelberg, First International Workshop Cambridge, U.K., May 30 - Jun. 1, 1996, Information Hiding Lecture Notes in Computer Science, vol. 1174, pp. 137-150 (1996).
"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
Notification of Transmittal of the International Search Report and the Written Opinion of the International Searching Authority, or the Declaration for International Application No. PCT/US2022/026418 (dated Jul. 8, 2022).
Notification of Transmittal of the International Search Report and the Written Opinion of the International Searching Authority, or the Declaration for International Application No. PCT/US2022/026417 (dated Jul. 8, 2022).
Notification of Transmittal of the International Search Report and the Written Opinion of the International Searching Authority, or the Declaration for International Application No. PCT/US2022/023899 (dated Jul. 1, 2022).
Notice of Allowance and Fee(s) Due for U.S. Appl. No. 17/314,300 (dated Jun. 6, 2022).
Non-Final Office Action for U.S. Appl. No. 17/145,143 (dated Mar. 15, 2022).
Notification of Transmittal of the International Search Report and the Written Opinion of the International Searching Authority, or the Declaration for U.S. Patent Application Serial No. PCT/US2021/064102 (dated Apr. 7, 2022).
Ericsson, "New Solution to KI#5: End-to-end integrity protection of HTTP body and method," 3GPP TSG-SA3 Meeting #102Bis-e, pp. 1-3 (Mar. 1-5, 2021).
"3rd Generation Partnership Project; Technical Specification Group Services and System Aspects; Security architecture and procedures for 5G system (Release 17)," 3GPP TS 33.501, V17.1.0, pp. 1-256 (Mar. 2021).
Commonly-Assigned, co-pending U.S. Appl. No. 17/145,143 for "Methods, Systems, and Computer Readable Media for Preventing Subscriber Identifier Leakage," (Unpublished, filed Jan. 8, 2021).
"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).
"3rd Generation Partnership Project; Technical Specification Group Services and System Aspects; Security architecture and procedures for 5G system (Release 16)," 3GPP TS 33.501, V16.4.0, pp. 1-249 (Sep. 2020).
"3rd Generation Partnership Project; Technical Specification Group Core Network and Terminals; 5G System; Authentication Server Services; Stage 3 (Release 16)," 3GPP TS 29,509, V16.5.0 pp. 1-60 (Sep. 2020).
Nokia et al., "Integrity protection of service request in indirect communication," 3GPP TSG-SA3, Meeting#100e, pp. 1-3 (Aug. 17-28, 2020).
"3rd Generation Partnership Project; Technical Specification Group Services and System Aspects; Security Aspects; Study on security aspects of the 5G Service Based Architecture (SBA) (Release 16)," 3GPP TR 33.855, V16.0.0, pp. 1-131 (Jul. 2020).

(56) References Cited

OTHER PUBLICATIONS

"5G; Security architecture and procedures for 5G System (3GPP TS 33.501 version 16.6.0 Release 16)," ETSI TS 133 501, V16.6.0, pp. 1-258 (Apr. 2021).
Notice of Allowance and Fee(s) Due and Examiner-Initiated Interview Summary for U.S. Appl. No. 17/145,143 (dated Aug. 11, 2022).
Non-Final Office Action for U.S. Appl. No. 17/308,972 (dated Aug. 5, 2022).
Notification of Transmittal of the International Search Report and the Written Opinion of the International Searching Authority, or the Declaration for International Application No. PCT/US2022/023894 (dated Aug. 1, 2022).
"3rd Generation Partnership Project; Technical Specification Group Services and System Aspects; Study on Enhancements to the Service-Based Architecture (Release 16)," 3GPP TR 23.742, V1.0.0, pp. 1-101 (Sep. 2018).
Notice of Allowance and Fee(s) Due and Examiner-Initiated Interview Summary for U.S. Appl. No. 17/145,143 (dated Sep. 2, 2022).
Notice of Allowance and Fee(s) Due for U.S. Appl. No. 17/314,329 (dated Dec. 20, 2022).
Notice of Allowance and Fee(s) Due for U.S. Appl. No. 17/308,972 (dated Nov. 18, 2022).
Commonly-Assigned, co-pending U.S. Appl. No. 17/987,820 for "Methods, Systems, and Computer Readable Media for Detecting Stolen Access Tokens," (Unpublished, filed Nov. 15, 2022).
Housley et al. "Internet X.509 Public Key Infrastructure Certificate and CRL Profile," Network Working Group, Request for Comments: 2459, pp. 1-129 (Jan. 1999).
Jones et al., "JSON Web Token (JWT)," Internet Engineering Task Force (IETF), Request for Comments: 7519, pp. 1-30 (May 2015).
"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).
"3rd Generation Partnership Project; Technical Specification Group Services and System Aspects; Security architecture and procedures for 5G system (Release 17)," 3GPP TS 33.501, V17.7.0, pp. 1-292 (Sep. 2022).
Restriction Requirement for U.S. Appl. No. 17/314,329 (dated Nov. 7, 2022).
Notice of Allowance and Fee(s) Due for U.S. Appl. No. 17/314,300 (dated Sep. 27, 2022).

\* cited by examiner

Encoded

```
eyJhbGciOiJFUzI1NiIsInR5cCI6IkpXVCIsIng
idSI6Imh0dHBzOi8vYS9iL2MifQ.eyJzdWIiOiJ
ORkluc3RhbmNlSWQiLCJhdWQiOiJOUkYiLCIzZ3
Bwc2JpcmVxaGFzaCI6IjNncHBTYm1SZXFIYXNoI
iwiaWF0IjoxNjE2MjM5MDIyLCJleHAiOjE2MjYy
MzkwMjJ9.4jQUjrLk7Y5rusykZhWiDf4s8tIzF-
XjOMgfYLbfNzGQP6Thr_RBqVzk4pr9gOZ985ECe
Gqfqsa_LviS5Nuvgw
```

Decoded

HEADER: ALGORITHM & TOKEN TYPE

```
{
  "alg": "ES256",
  "typ": "JWT",
  "x5u": "https://a/b/c"
}
```

PAYLOAD: DATA

```
{
  "sub": "NFInstanceId",
  "aud": "NRF",
  "3gppSbireqhash": "3gppSbiReqHash",
  "iat": 1616239822,
  "exp": 1626239822
}
```

VERIFY SIGNATURE

```
ECDSASHA256(
  base64UrlEncode(header) + "." +
  base64UrlEncode(payload),
  -----BEGIN PUBLIC KEY-----
  MFkwEwYHKoZIzj0CAQYIKoZIzj
  0DAQcDQgAEEVs/o5+uObTjl3ch
  ynL4wKgBg2R9
  -----BEGIN PRIVATE KEY-----
  MIGHAgEAMBMGByqGSM49AgEGCC
  qGSM44AwEHBG0wawIBAQQgevZz
  LtgdAFr28hb2
)
```

FIG. 5A

METHODS, SYSTEMS, AND COMPUTER READABLE MEDIA FOR SINGLE-USE AUTHENTICATION MESSAGES

TECHNICAL FIELD

The subject matter described herein relates to secure communications within telecommunications networks. More particularly, the subject matter described herein relates to methods, systems, and computer readable media for single-use authentication messages.

BACKGROUND

In fifth generation (5G) communications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF. In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF instance.

The 3rd Generation Partnership Project (3GPP) suggests usage of 3gpp-Sbi-Client-Credentials header (CCA—Client Credentials Assertion) for client authentication in certain situations. One issue with using CCAs is that the process does not provide protection against stolen CCA tokens. For example, a hacker having access to a stolen CCA can invoke another SBI request in the network using the stolen CCA.

In light of these and other difficulties, there exists a need for methods, systems, and computer readable media for single-use authentication messages.

SUMMARY

A method for creating single-use authentication messages includes creating, at a consumer network function of a core network of a telecommunications network, a message hash of at least a subset of a request message. The method includes adding, at the consumer network function, the message hash to a client credentials assertion (CCA) token for the consumer network function. The method includes sending, from the consumer network function, the request message with the CCA token to a producer network function.

According to another aspect of the subject matter described herein, the method includes, at the producer network function: validating that the CCA token is signed and not expired; validating that a hash of the received request message matches the message hash of the CCA token; and sending a response to the consumer network function.

According to another aspect of the subject matter described herein, the method includes, at a proxy between the consumer network function and producer network function: validating that a hash of the received request message matches the message hash of the CCA token; and forwarding the request message to the producer network function in response to validating that the hash of the received request message matches the message hash of the CCA token.

According to another aspect of the subject matter described herein, the method includes, at the producer network function: validating that the CCA token is signed and not expired; and sending a response to the consumer network function.

According to another aspect of the subject matter described herein, creating the message hash comprises using one or more portions of the request message that are specified to not be modified by proxies of the telecommunications network.

According to another aspect of the subject matter described herein, the one or more portions of the request message that are specified to not be modified by proxies of the telecommunications network include an authority header of the request message.

According to another aspect of the subject matter described herein, the method includes enabling or disabling single-use authentication messages on a per-interface basis for a plurality of different interfaces of the network core.

According to another aspect of the subject matter described herein, the network core is a 5G network core.

According to another aspect of the subject matter described herein, the CCA token comprises a plurality of fields including a network function instance identifier, an issued-at timestamp, an expiration time, and the message hash.

According to another aspect of the subject matter described herein, the request message is an inter-public land mobile network (PLMN) message destined for a different PLMN configured for cross-certification.

According to another aspect of the subject matter described herein, a system for creating single-use authentication messages includes at least one processor and a memory. The system further includes a consumer network function of a core network of a telecommunications network, the consumer network function implemented by the at least one processor and configured for creating a message hash of at least a subset of a request message; adding the message hash to a CCA token for the consumer network function; and sending the request message with the CCA token to a producer network function.

According to another aspect of the subject matter described herein, the producer network function is configured for: validating that the CCA token is signed and not expired; validating that a hash of the received request message matches the message hash of the CCA token; and sending a response to the consumer network function.

According to another aspect of the subject matter described herein, the system includes a proxy between the consumer network function and producer network function, the proxy configured for: validating that a hash of the received request message matches the message hash of the CCA token; and forwarding the request message to the producer network function in response to validating that the hash of the received request message matches the message hash of the CCA token.

According to another aspect of the subject matter described herein, the producer network function is configured for validating that the CCA token is signed and not expired and sending a response to the consumer network function.

According to another aspect of the subject matter described herein, creating the message hash comprises using one or more portions of the request message that are specified to not be modified by proxies of the telecommunications network.

According to another aspect of the subject matter described herein, the one or more portions of the request message that are specified to not be modified by proxies of the telecommunications network include an authority header of the request message.

According to another aspect of the subject matter described herein, the consumer network function is configured for enabling or disabling single-use authentication messages on a per-interface basis for a plurality of different interfaces of the network core.

According to another aspect of the subject matter described herein, the network core is a 5G network core.

According to another aspect of the subject matter described herein, the CCA token comprises a plurality of fields including a network function instance identifier, an issued-at timestamp, an expiration time, and the message hash.

According to another aspect of the subject matter described herein, the request message is an inter-public land mobile network (PLMN) message destined for a different PLMN configured for cross-certification.

According to another aspect of the subject matter described herein, a non-transitory computer readable medium having stored thereon executable instructions that when executed by a processor of a computer control the computer to perform steps is provided. The steps include creating, at a consumer network function of a core network of a telecommunications network, a message hash of at least a subset of a request message; adding, at the consumer network function, the message hash to a CCA token for the consumer network function; and sending, from the consumer network function, the request message with the CCA token to a producer network function.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 5A shows an example single-use CCA in an encoded format and a decoded format;

DETAILED DESCRIPTION

The subject matter described herein relates to methods, systems, and computer readable media for single-use authentication messages.

In 5G telecommunications networks, the network node that provides service is referred to as a producer network function (NF). A network node that consumes services is referred to as a consumer NF. A network function can be both a producer NF and a consumer NF depending on whether it is consuming or providing service. An NF instance is an instance of a producer NF that provides a service. A given producer NF may include more than one NF instance.

The 3GPP suggests usage of 3gpp-Sbi-Client-Credentials header (CCA—Client Credentials Assertion) for client authentication in certain situations. One issue with using CCAs is that the process does not provide protection against stolen CCA tokens. For example, a hacker having access to a stolen CCA can invoke another SBI request in the network using the stolen CCA.

The existing expiration field in the CCA does not completely protect against a stolen token attack. Instead, the existing expiration field makes the attack tougher by requiring the hacker to invoke another SBI request before the CCA expires. Reducing the expiration time does not fully protect against misuse.

Moreover, not all SBI APIs are equal in terms of security and performance. Some SBI APIs, e.g., NRF Deregistration, need to be highly secure whereas others may choose performance over security. It can be useful to allow network functions to tradeoff between security and performance.

This specification describes methods and systems for creating and using single-use CCA tokens in core networks of telecommunication networks. The use of single-use CCA tokens can prevent a hacker from using a stolen CCA to invoke another SBI request in the network using the stolen CCA.

Figure 1:
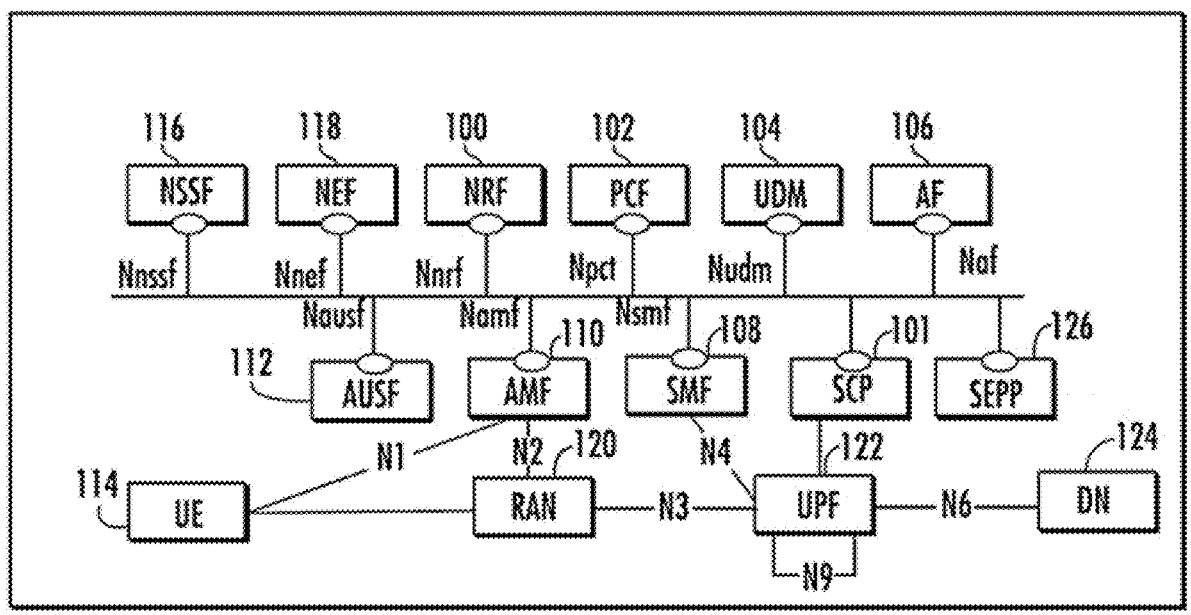
FIG. 1 is a block diagram illustrating an example 5G system network architecture.

FIG. 1 is a block diagram illustrating an example 5G system network architecture. The architecture in FIG. 1 includes NRF 100 and SCP 101, which may be located in the same home public land mobile network (HPLMN). NRF 100 may maintain profiles of available producer NF service instances and their supported services and allow consumer NFs or SCPs to subscribe to and be notified of the registration of new/updated producer NF service instances.

SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in 3GPP Technical Specification (TS) 29.510.

In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services.

The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality.

UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

3GPP Technical Specifications 33501 section 13.3.1.2 and section 13.3.2.2 suggest using CCAs for indirect communication for NF to NRF and NF to NF communication.

33501 section 13.3.8.2 suggests that CCA tokens shall include:
  the NF instance ID of the NF service consumer (subject)
  A timestamp (iat) and an expiration time (exp), and
  The NF type of the expected audience (audience) i.e. the type "NRF", "NF Service Producer"

NF Service Consumer is configured to digitally sign the generated CCA based on its private key as described in RFC 7515. The signed CCA shall include one of the following fields:
  the X.509 URL (x5u) to refer to X.509 public certificate for validating the CCA.
  the X.509 Certificate Chain (x5c) include X.509 public certificate for validating the CCA TS 29.500 section 5.2.3.2.11 explains 3gpp-Sbi-Client-Credentials with following attributes.

| Attribute name | Data type | P | Cardinality | Description |
| --- | --- | --- | --- | --- |
| sub | NfInstanceId | M | 1 | This IE shall contain the NF instance ID of the NF service consumer, corresponding to the standard "Subject" claim described in IETF RFC 7519 [41], clause 4.1.2. |
| iat | Integer | M | 1 | This IE shall indicate the time at which the JWT was issued, corresponding to the standard "Issued At" claim described in IETF RFC 7519 [41], clause 4.1.6. This claim may be used to determine the age of the JWT. |
| exp | Integer | M | 1 | This IE shall contain the expiration time after which the client credentials assertion is considered to be expired, corresponding to the standard "Expiration Time" claim described in IETF RFC 7519 [41], clause 4.1.4 |

-continued

| Attribute name | Data type | P | Cardinality | Description |
|---|---|---|---|---|
| aud | Array(NFType) | M | 1 . . . N | This IE shall contain the NF type of the NF service producer and/or "NRF", for which the claim is applicable, corresponding to the standard "Audience" claim described in IETF RFC 7519 [41], clause 4.1.3 |

For example, a sample CCA payload could be represented as follows:

```
{
    "sub": "NFInstanceIDXXX",
    "aud": "NRF",
    "iat": 1616239022,
    "exp": 1616339022
}
```

The fields in the CCA payload include the following:

| Attribute | Description |
|---|---|
| sub | NF instance ID of the NF Service Consumer |
| aud | NF type of the Producer |
| iat | Issued At timestamp |
| exp | Expiration Time |

One issue with using CCAs is that the process does not provide protection against stolen CCA tokens. For example, a hacker having access to a stolen CCA can invoke another SBI request in the network using the stolen CCA.

The existing expiration field in the CCA does not completely protect against a stolen token attack. Instead, the existing expiration field makes the attack tougher by requiring the hacker to invoke another SBI request before the CCA expires. Reducing the expiration time does not fully protect against misuse.

To prevent these kinds of misuse, one or more of the network functions can be configured to use single-use CCAs. The single-use CCAs are single-use in the sense that they can only be used for authentication of a single message. To create and use the single-use CCAs, the system can be configured as follows:

Create CCA which can be used only once, so even if the CCA token is stolen, it cannot be misused.
To make sure that the CCA can be used only once, add the SBI message (HTTP header+Body) hash to the CCA.
    Any header or body attribute which is allowed to be modified by proxies shall be excluded when creating the hash.
    For example, the authority header shall not be part of the SBI message hash as that can be updated by SCP for alternate routing.
Adding the SBI message hash to the CCA makes sure that the CCA can be used only once with the given SBI message.
Single Use CCA validation can be done either at SCP or Producer NF depending on the operator policies.
CCA can be enabled or disabled based on the Service Based Interface. For example: operator may choose to enable CCA for NF Management Service APIs which need high security, but not other APIs.

Figure 2:
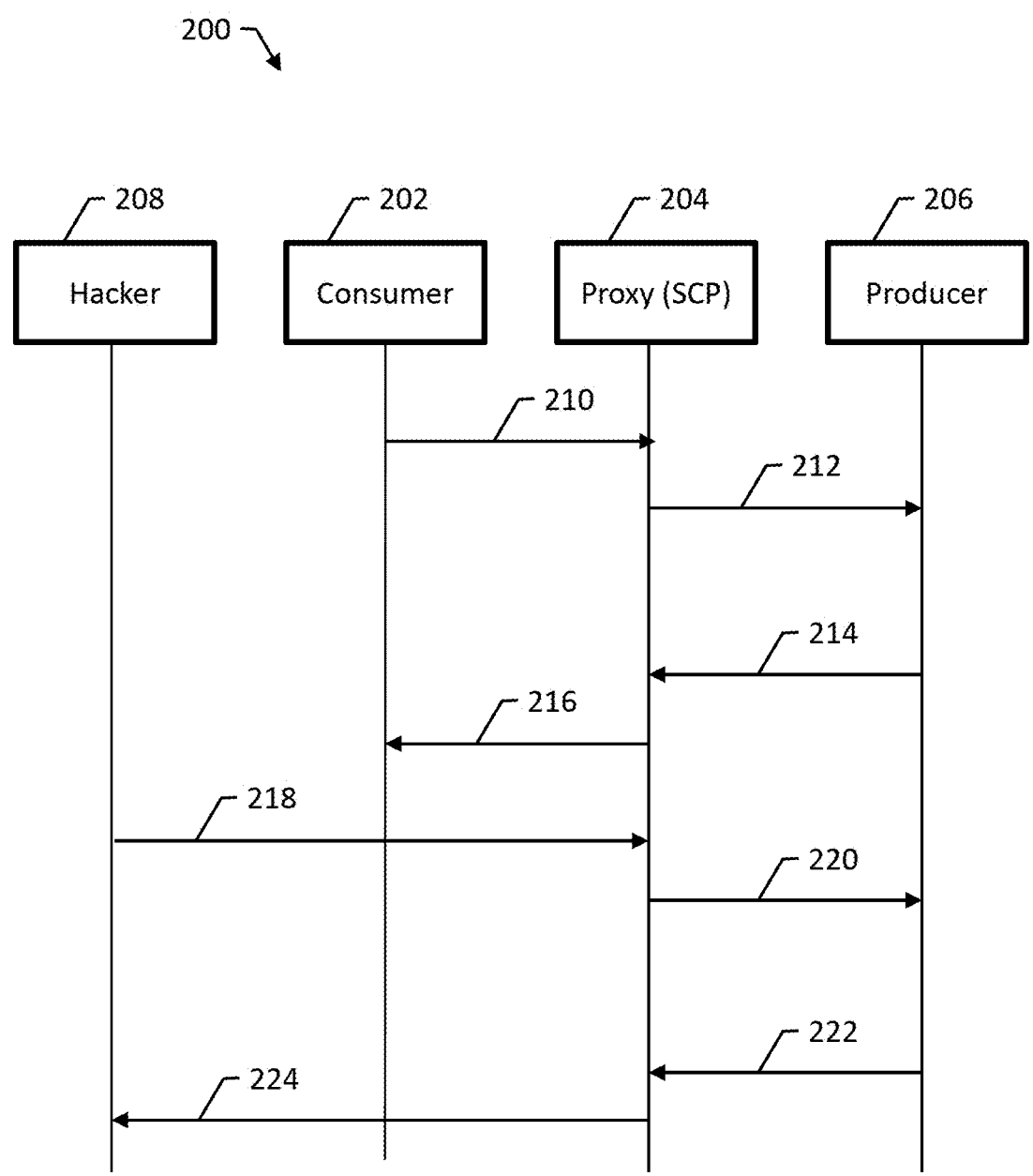
FIG. 2 is a message flow diagram illustrating an example scenario where a hacker successfully misuses a stolen CCA token.

FIG. 2 is a message flow diagram illustrating an example scenario 200 where a hacker successfully misuses a stolen CCA token. FIG. 2 illustrates an example consumer network function 202, an example proxy (SCP) 204, and an example producer network function 206. A hacker computer system 208 is also shown.

Consumer network function 202 sends an SBI request message 210 including a CCA token. SCP 204 receives the SBI request message 210 and forwards the SBI request message 212 to producer network function 206.

Producer network function 206 validates that the CCA token is signed by consumer network function 202. In response to validating the CCA token, producer network function 206 sends an SBI response message 214 to SCP 204. SCP 204 receives the SBI response message 214 and forwards the SBI response message 216 to consumer network function 202.

Hacker 208 intercepts the CCA token during the exchange. Hacker 208 then sends an SBI request message 218 with the stolen CCA token. SCP 204 receives the SBI request message 218 and forwards the SBI request message 220 to producer network function 206.

Producer network function 206 validates that the CCA token is signed by consumer network function 202, even though the CCA token should be rejected since SBI request message 218 originated from hacker 208. If the stolen CCA token has not expired, producer network function 206 sends an SBI response message 222 to SCP 204. SCP 204 receives the SBI response message 222 and forwards the SBI response message 224 to hacker 208.

Figure 3:
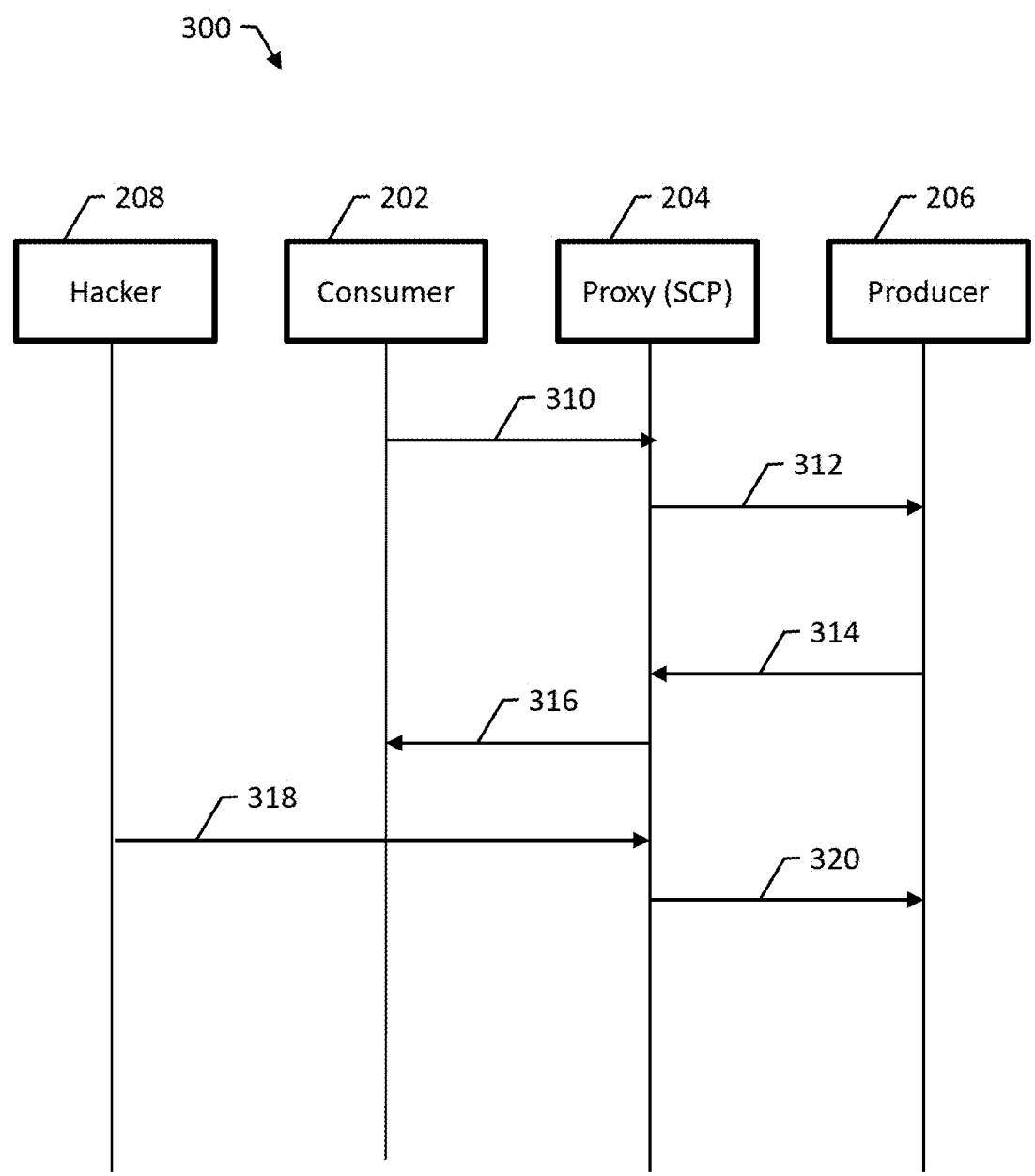
FIG. 3 is a message flow diagram illustrating an example scenario where the use of a single-use CCA successfully blocks misuse of a stolen CCA at a producer network function.

FIG. 3 is a message flow diagram illustrating an example scenario 300 where the use of a single-use CCA successfully blocks misuse of a stolen CCA at a producer network function. In the example scenario 300, producer network function 206 validates the message hash of the single-use CCA.

Consumer network function 202 sends an SBI request message 310 including a single-use CCA token. The single-use CCA token includes a message hash of the SBI request message 310. SCP 204 receives the SBI request message 310 and forwards the SBI request message 312 to producer network function 206.

Producer network function 206 validates that the single-use CCA token is signed by consumer network function 202. Producer network function 206 also validates that a message hash of the SBI request message 312 matches the message hash contained in the single-use CCA token.

In response to validating the single-use CCA token, producer network function 206 sends an SBI response message 314 to SCP 204. SCP 204 receives the SBI response message 314 and forwards the SBI response message 316 to consumer network function 202.

Hacker 208 intercepts the single-use CCA token during the exchange. Hacker 208 then attempts to invoke a different SBI request by sending an SBI request message 318 with the stolen CCA token. SCP 204 receives the SBI request message 318 and forwards the SBI request message 320 to producer network function 206.

Producer network function 206 validates that the stolen CCA token is signed by consumer network function 202 and is not expired. Producer network function 206 attempts to validate that a message hash of the SBI request message 318 matches the message hash contained in the single-use CCA token; however, this attempt fails because the message hash contained in the single-use CCA token is a hash of the original message 310 and is therefore not the same as a message hash of the messages 318 from hacker 208. Producer network function 206 can then reject the request from hacker 208.

Figure 4:
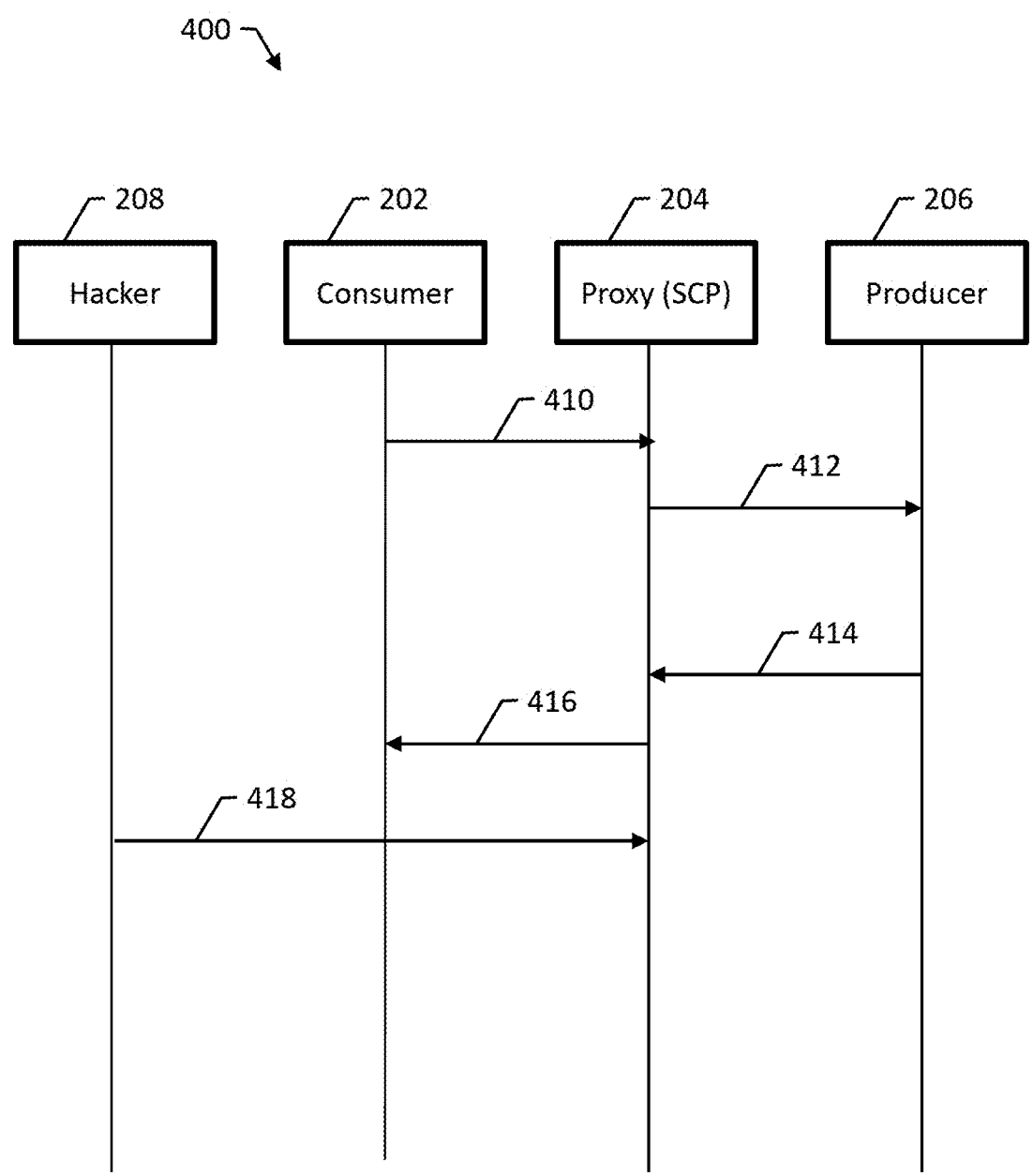
FIG. 4 is a message flow diagram illustrating an example scenario where the use of a single-use CCA successfully blocks misuse of a stolen CCA at a proxy function.

FIG. 4 is a message flow diagram illustrating an example scenario 400 where the use of a single-use CCA successfully blocks misuse of a stolen CCA at a proxy function. In the example scenario 400, SCP 204 validates the message hash of the single-use CCA.

Consumer network function 202 sends an SBI request message 410 including a single-use CCA token. The single-use CCA token includes a message hash of the SBI request message 410. SCP 204 receives the SBI request message 410.

SCP 204 validates that a message hash of the SBI request message 410 matches the message hash contained in the single-use CCA token. In response to validating the message hash, SCP 204 forwards the SBI request message 412 to producer network function 206.

Producer network function 206 validates that the single-use CCA token is signed by consumer network function 202 and is not expired. In response to validating the single-use CCA token, producer network function 206 sends an SBI response message 414 to SCP 204. SCP 204 receives the SBI response message 414 and forwards the SBI response message 416 to consumer network function 202.

Hacker 208 intercepts the single-use CCA token during the exchange. Hacker 208 then attempts to invoke a different SBI request by sending an SBI request message 418 with the stolen CCA token. SCP 204 receives the SBI request message 418 and attempts to validate that a message hash of the SBI request message 418 matches the message hash contained in the single-use CCA token; however, this attempt fails because the message hash contained in the single-use CCA token is a hash of the original message 410 and is therefore not the same as a message hash of the messages 418 from hacker 208. SCP 204 can then reject the request from hacker 208.

The single-use CCA token can be formatted, for example, as follows:

```
{
    "sub": "NFInstanceIDXXX",
    "aud": "NRF",
    "3gppsbireqhash":"sbiReqHash",
    "iat": 1616239022,
    "exp": 1616339022
}
```

The fields in the example CCA payload are described below:

| Attribute | Description |
| --- | --- |
| sub | NF instance ID of the NF Service Consumer |
| aud | NF type of the Producer |
| iat | Issued At timestamp |
| exp | Expiration Time |
| 3gppsbireqhash | New Field containing the hash of the SBI request. |

FIG. 5A shows an example single-use CCA in an encoded format and a decoded format. The 3gppsbireqhash field is added to the conventional CCA described above as part of the single-use CCA solution.

Figure 5B:
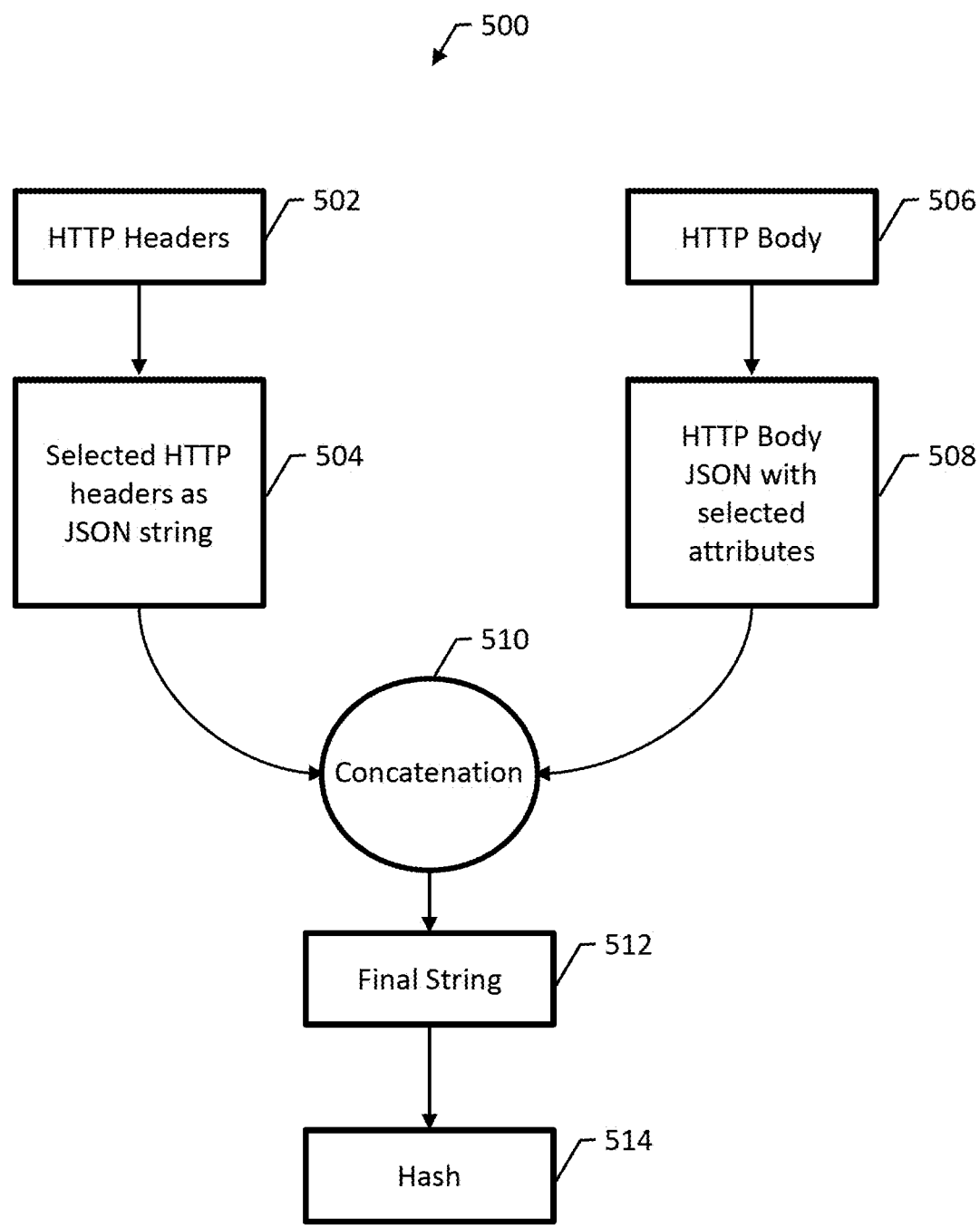
FIG. 5B is a flow diagram illustrating an example method for creating a message hash.

FIG. 5B is a flow diagram illustrating an example method 500 for creating a message hash.

HTTP headers 502 are selected. Typically, only headers which are not allowed to be modified by proxies are selected. For example, an operator policy may specify which headers are allowed to be modified by proxies. The HTTP headers are converted 504 into a JSON array string. The HTTP body 506 is also converted 508 into a JSON array string, e.g., with selected attributes.

The headers JSON string is concatenated 510 with the body JSON string. The headers JSON string concatenated with the body JSON string forms a final string 512. Then a hash 514 is applied to the final string 512. Any appropriate type of hashing algorithm can be used.

One or more of various features of the single-use CCA system can be configured, e.g., for a particular operator or system.

The single-use CCA feature can be enabled based on the SBA interface.

Some SBA interfaces prefer security over performance whereas other prefer performance over security. There is a tradeoff between security and performance.

The single-use CCA configuration is set up on both on consumer and producer network functions.

Consumer network functions are configured to make sure to add SBI message hash to the CCA.

Producer network functions (or proxies) are configured to validate SBI message hash in the CCA.

The following diagram shows a sample configuration showing single-use CCA enabled only for NRF management APIs and disabled for everything else:

| Method | URI | Enabled |
| --- | --- | --- |
| DELETE | /nnrf-nfm/v1/nf-instances | YES |
| PUT | /nnrf-nfm/v1/nf-instances | YES |
| PATCH | /nnrf-nfm/v1/nf-instances | YES |
| ALL | ALL | NO |

The single-use CCA systems and methods can provide one or more of the following advantages.

Prevents Security Attacks misusing stolen CCA.
  Security attack can cause complete network outage.
Solution can enabled on selective 5G SBA interfaces giving benefit of both enhanced security and performance.
If implemented on SCP/SEPP, provides centralized configuration of security aspect of CCA validation.
Extensible to both intra PLMN and inter PLMN messages.
  Note that CCA can be used for inter PLMN message if cross certification exists between the PLMNs.

Extensible to SCP and SEPP in addition to Producer NF.

Figure 6:
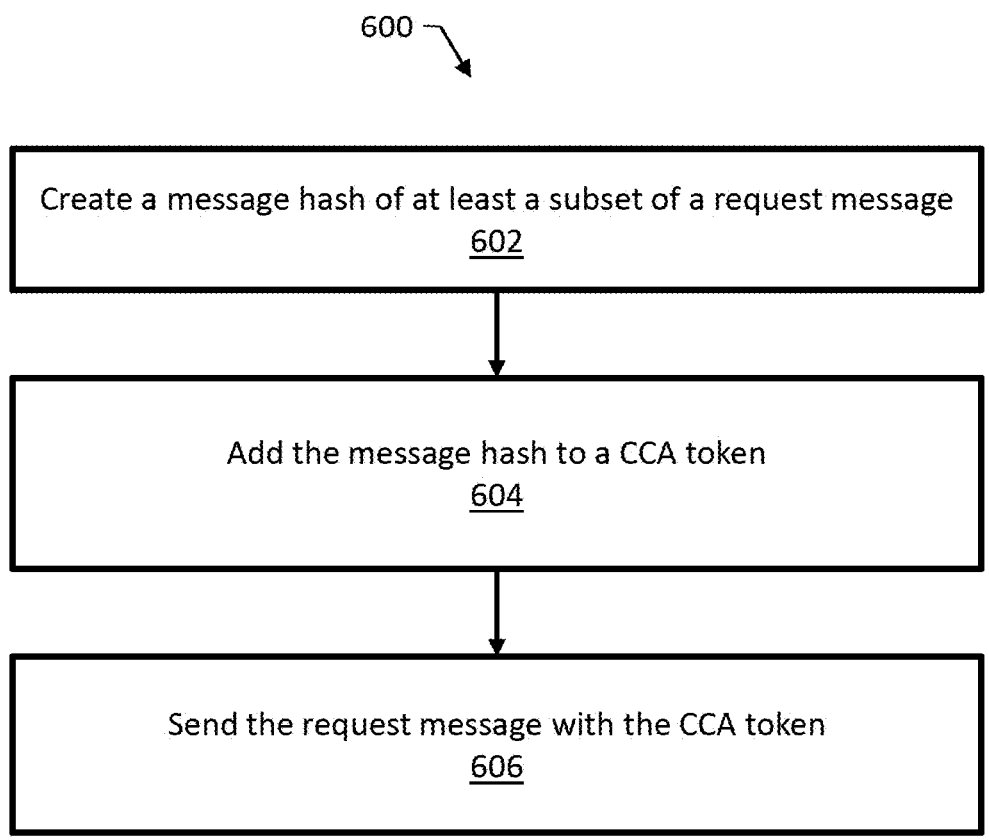
FIG. 6 is a flow diagram of an example method for creating single-use authentication messages.

FIG. 6 is a flow diagram of an example method 600 for creating single-use authentication messages.

Method 600 includes creating, at a consumer network function of a core network of a telecommunications network, a message hash of at least a subset of a request message (602). Method 600 includes adding, at the consumer network function, the message hash to a client credentials assertion (CCA) token for the consumer network function (604). Method 600 includes sending, from the consumer network function, the request message with the CCA token to a producer network function (606).

In some examples, the message hash is validated by the producer network function; in some other examples, the message has is validated by a proxy. Validating the message hash includes hashing the received message using the same hashing algorithm used to generate the message hash and comparing the hash of the received message with the message hash in the CCA token. If the hash of the received message matches the message hash in the CCA token, then the request message can be authenticated.

In some examples, method 600 includes, at the producer network function: validating that the CCA token is signed and not expired; validating that a hash of the received request message matches the message hash of the CCA token; and sending a response to the consumer network function.

In some examples, method 600 includes, at a proxy between the consumer network function and producer network function: validating that a hash of the received request message matches the message hash of the CCA token; and forwarding the request message to the producer network function in response to validating that the hash of the received request message matches the message hash of the CCA token. In some examples, method 600 includes, at the producer network function: validating that the CCA token is signed and not expired; and sending a response to the consumer network function.

In some examples, creating the message hash comprises using one or more portions of the request message that are specified to not be modified by proxies of the telecommunications network. In some examples, the one or more portions of the request message that are specified to not be modified by proxies of the telecommunications network include an authority header of the request message.

In some examples, method 600 includes enabling or disabling single-use authentication messages on a per-interface basis for a plurality of different interfaces of the network core.

In some examples, the network core is a 5G network core. In some examples, the CCA token comprises a plurality of fields including a network function instance identifier, an issued-at timestamp, an expiration time, and the message hash.

In some examples, the request message is an inter-public land mobile network (PLMN) message destined for a different PLMN configured for cross-certification.

Figure 7:
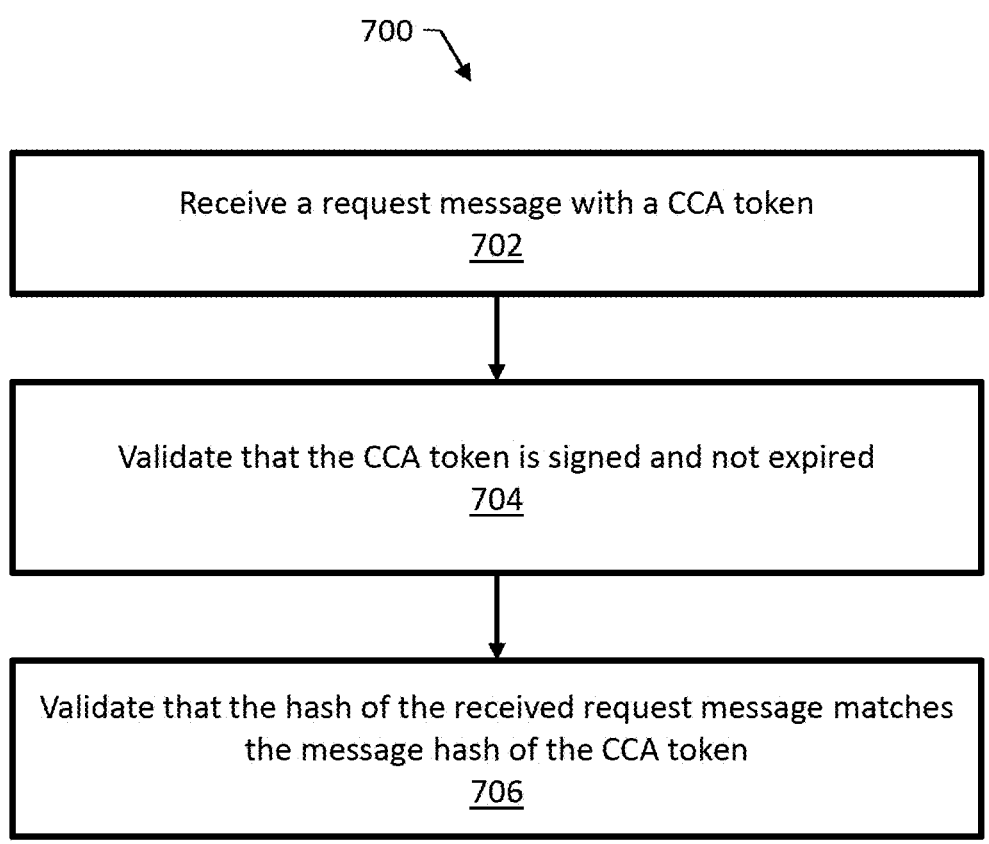
FIG. 7 is a flow diagram of an example method for receiving a single-use authentication message.

FIG. 7 is a flow diagram of an example method 700 for receiving a single-use authentication message. The method 700 can be performed, for example, by a producer network function.

Method 700 includes receiving a request message with a CCA token (702). Method 700 includes validating that the CCA token is signed and not expired (704). Method 700 includes validating that the hash of the received request message matches the message hash of the CCA token (706).

In some examples, the message hash is validated by the producer network function; in some other examples, the message has is validated by a proxy. Validating the message hash includes hashing the received message using the same hashing algorithm used to generate the message hash and comparing the hash of the received message with the message hash in the CCA token. If the hash of the received message is equivalent to the message hash in the CCA token, then the request message can be authenticated.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:

A method for creating single-use authentication messages, the method comprising:

creating, at a consumer network function of a core network of a telecommunications network, a message hash of at least a subset of a request message, wherein creating the message hash comprises using one or more portions of the request message that are specified to not be modified by proxies of the telecommunications network, and wherein the one or more portions of the request message that are specified to not be modified by proxies of the telecommunications network include an authority header of the request message;

adding, at the consumer network function, the message hash to a client credentials assertion (CCA) token for the consumer network function;

sending, from the consumer network function, the request message with the CCA token to a producer network function; and enabling or disabling single-use authentication messages on a per-interface basis for a plurality of different interfaces of the network core, wherein enabling or disabling single use authentication messages comprises receiving operator input specifying enabling single use authentication messages for a first plurality of interfaces and disabling single use authentication messages for at least one other interface.

2. The method of claim 1, comprising, at the producer network function:

validating that the CCA token is signed and not expired;

validating that a hash of the received request message matches the message hash of the CCA token; and sending a response to the consumer network function.

3. The method of claim 1, comprising, at a proxy between the consumer network function and producer network function:

validating that a hash of the received request message matches the message hash of the CCA token; and forwarding the request message to the producer network function in response to validating that the hash of the received request message matches the message hash of the CCA token.

4. The method of claim 3, comprising, at the producer network function:
   validating that the CCA token is signed and not expired; and
   sending a response to the consumer network function.

5. The method of claim 1, wherein the network core is a 5G network core.

6. The method of claim 5, wherein the CCA token comprises a plurality of fields including a network function instance identifier, an issued-at timestamp, an expiration time, and the message hash.

7. The method of claim 1, wherein the request message is an inter-public land mobile network (PLMN) message destined for a different PLMN configured for cross-certification.

8. A system for creating single-use authentication messages, the system comprising:
   at least one processor and a memory; and
   a consumer network function of a core network of a telecommunications network, the consumer network function implemented by the at least one processor and configured for:
   creating a message hash of at least a subset of a request message, wherein creating the message hash comprises using one or more portions of the request message that are specified to not be modified by proxies of the telecommunications network, and wherein the one or more portions of the request message that are specified to not be modified by proxies of the telecommunications network include an authority header of the request message;
   adding the message hash to a client credentials assertion (CCA) token for the consumer network function;
   sending the request message with the CCA token to a producer network function; and
      enabling or disabling single-use authentication messages on a per-interface basis for a plurality of different interfaces of the network core, wherein enabling or disabling single use authentication messages comprises receiving operator input specifying enabling single use authentication messages for a first plurality of interfaces and disabling single use authentication messages for at least one other interface.

9. The system of claim 8, wherein the producer network function is configured for: validating that the CCA token is signed and not expired;
   validating that a hash of the received request message matches the message hash of the CCA token; and
   sending a response to the consumer network function.

10. The system of claim 8, comprising a proxy between the consumer network function and producer network function, the proxy configured for:
   validating that a hash of the received request message matches the message hash of the CCA token; and
   forwarding the request message to the producer network function in response to validating that the hash of the received request message matches the message hash of the CCA token.

11. The system of claim 10, wherein the producer network function is configured for validating that the CCA token is signed and not expired and sending a response to the consumer network function.

12. The system of claim 8, wherein the network core is a 5G network core.

13. The system of claim 12, wherein the CCA token comprises a plurality of fields including a network function instance identifier, an issued-at timestamp, an expiration time, and the message hash.

14. A non-transitory computer readable medium having stored thereon executable instructions that when executed by a processor of a computer control the computer to perform steps comprising:
   creating, at a consumer network function of a core network of a telecommunications network, a message hash of at least a subset of a request message, wherein creating the message hash comprises using one or more portions of the request message that are specified to not be modified by proxies of the telecommunications network, and wherein the one or more portions of the request message that are specified to not be modified by proxies of the telecommunications network include an authority header of the request message;
   adding, at the consumer network function, the message hash to a client credentials assertion (CCA) token for the consumer network function;
   sending, from the consumer network function, the request message with the CCA token to a producer network function; and
   enabling or disabling single-use authentication messages on a per-interface basis for a plurality of different interfaces of the network core, wherein enabling or disabling single use authentication messages comprises receiving operator input specifying enabling single use authentication messages for a first plurality of interfaces and disabling single use authentication messages for at least one other interface.

* * * * *

UNITED STATES PATENT AND TRADEMARK OFFICE
CERTIFICATE OF CORRECTION

| | |
|---|---|
| PATENT NO. | : 11,695,563 B2 |
| APPLICATION NO. | : 17/314382 |
| DATED | : July 4, 2023 |
| INVENTOR(S) | : Rajput et al. |

It is certified that error appears in the above-identified patent and that said Letters Patent is hereby corrected as shown below:

On the Title Page

On page 2, Column 1, under U.S. Patent Documents, Line 48, delete "Nos" and insert -- Livanos --, therefor.

Signed and Sealed this
Twenty-eighth Day of May, 2024

Katherine Kelly Vidal
*Director of the United States Patent and Trademark Office*